Nov. 13, 1962  S. J. WILLIAMSON, JR  3,063,515
FIXED STROKE ACTUATOR OR RELEASE MECHANISM
Filed Aug. 19, 1960
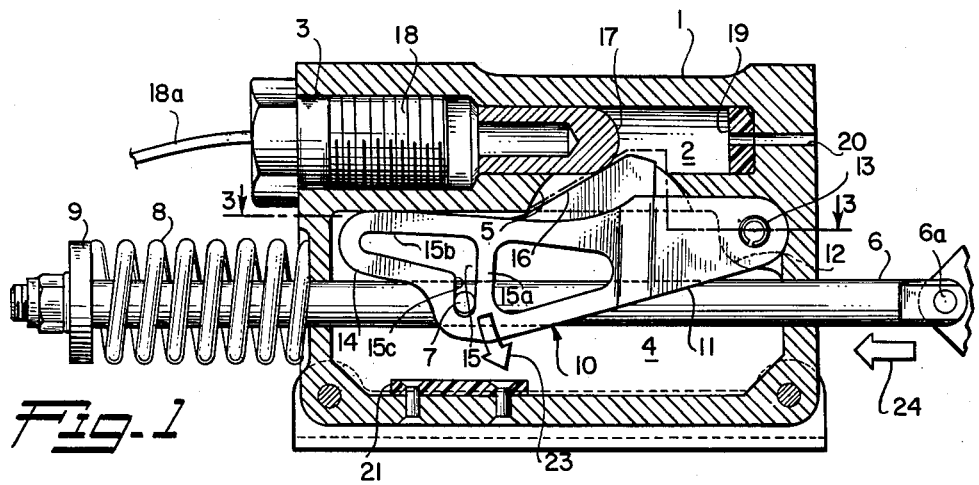
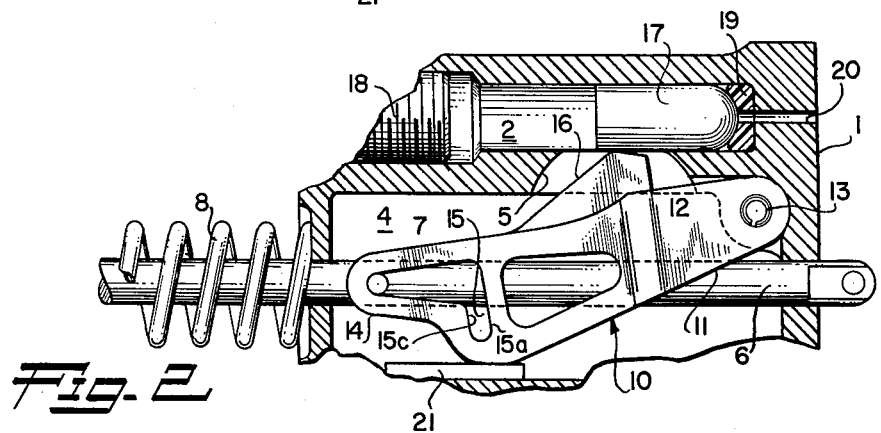
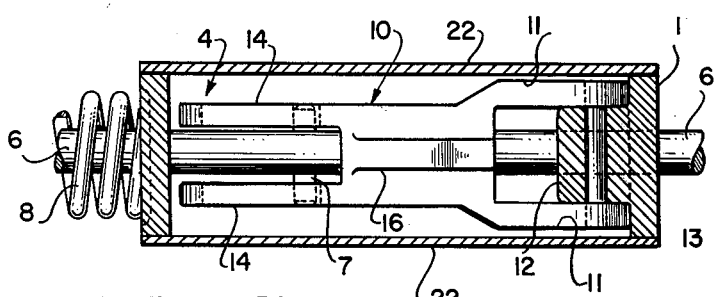
INVENTOR.
STEPHEN J. WILLIAMSON, JR.
BY
Agent 3,063,515
Patented Nov. 13, 1962

3,063,515
FIXED STROKE ACTUATOR OR RELEASE MECHANISM
Stephen J. Williamson, Jr., Smyrna, Ga., assignor to Lockheed Aircraft Corporation, Los Angeles, Calif.
Filed Aug. 19, 1960, Ser. No. 50,759
5 Claims. (Cl. 185—37)

This invention relates to actuator or release mechanisms, and more particularly to an explosive powered, non-destructive and reusable device, including remote actuation capabilities.

In the past, various arrangements and devices have been used and suggested for release mechanisms. Some of these prior arrangements and devices include cable systems and rigging, which, although non-destructive and reusable, are of considerable weight (and thus limited in distance for remote actuation), have a relatively long actuation time, are subject to inoperability under light icing conditions, and subject to inadvertent operations from shock loads. Some of the other prior art included explosive powered or actuated devices which would overcome most of the disadvantages of cable devices, but still have the disadvantages of being destructive of parts and not reusable, or have actuation take place by disassembly, which requires reassembly before reuse.

Accordingly, it is an object of this invention to provide a relatively simple and inexpensive release device of fixed stroke.

It is a further object of this invention to provide a non-destructive and reusable explosive powered release mechanism.

It is still another object of this invention to provide a release mechanism that can stand substantially high shock loads without inadvertent operation and include capabilities of operation in adverse ice conditions.

A still further object of this invention is to provide a release mechanism that is light in weight and capable of remote operation.

Other objects and advantages will become apparent from the following description taken in connection with the accompanying drawings in which:

FIGURE 1 is a partial cross-sectional view of one embodiment of this invention in a cocked or loaded condition;

FIGURE 2 is a partial cutaway view of the device shown in FIGURE 1 showing the relative positions of the members of the device after release actuation; and FIGURE 3 is a view taken along line 3—3 of FIGURE 1.

Generally stated, the invention comprises a spring loaded actuator rod having a radial pin therethrough, the rod held in cocked position by a restraint on the pin through a lock member, the lock member being movable to remove the restraint on the pin by an explosive powered piston.

Referring more particularly to the drawings, there is provided an open sided housing 1 with a cylindrical shaped chamber 2 extending into housing 1 at one end thereof, a portion of chamber 2 being threaded as indicated by 3. An open sided compartment or chamber 4 extends through the complete width of housing 1 and is in communication with chamber 2 through passage 5. A rod 6, having a radial pin 7 extending therethrough, extends through compartment 4 as well as exteriorly from both sides of housing 1 by passing through aligned openings in both end walls of housing 1. A connecting point 6a is provided at one end of rod 6 which supplies a pulling force upon actuation of the release, it being understood the connecting point 6a could also be located at the other end of rod 6 to supply a pushing force upon actuation or release. A biasing force to move rod 6 to the left, as viewed in the drawings, is supplied by a compression spring 8 located around rod 6 and between the exterior surface of one end wall of housing 1 and rod end 9 mounted circumferentially around the rod by any appropriate means.

A lock member 10 is bifurcated at one end to form tangs 11 which straddle lug 12 integral to the walls of compartment 4. Lock member 10 is pivotally secured within compartment 4 by any appropriate pin or shaft means 13 passing through aligned openings in lug 12 and both tangs 11.

The other end of lock member 10 is also bifurcated to form tangs or fingers 14 which straddle a part of the portion of rod 6 extending through compartment 4. An L-shaped cam slot or guide slot 15, formed by branches 15a and 15b, is located in each tang of finger 14, into which the projections of pin 7 from the surface of rod 6 are located and provide control for the relative movement between rod 6 and lock member 10 as described in more detail hereinafter, it being noted that the centerline of branch 15a forms an acute angle with the centerline of rod 6 from the center of pin 7 to connecting point 6a when lock member 10 is in cocked position as shown in FIGURE 1.

Lock member 10 has a projection 16 which extends through passage 5 into chamber 2 when in cocked position, as can best be seen in FIGURE 1. The portion of projection 16 extending into chamber 2 is shaped to coact with a piston 17 whose movement from the position shown in FIGURE 1 to the position shown in FIGURE 2 is caused by ignition of an explosive squib 18 mounted in the threaded portion 3 of chamber 2, the ignition of the squib caused by any appropriate or desired electric signal or current through conductor 18a.

19 is a buffer to arrest the motion and absorb the shock loads of piston 17, and is preferably of a nylon material, although any other appropriate type of shock absorbing material may be utilized. A passage 20 through housing 1 and buffer 19 communicates the interior of chamber or cylinder 2 between piston 17 and buffer 19 to the atmosphere for prevention of pressure build up in chamber 2 by the passage of piston 17 therethrough. Likewise, a buffer 21 is connected to housing 1 on an inner surface of compartment 4 which acts as a shock absorber for the lock member 10 during release actuation as described hereinafter.

Side covers 22 may be employed to close off compartment or chamber 4 from the ambient and are mounted to housing 1 by any appropriate means or manner, the purpose of covers 22 being more for confining the burning or completely unburned particles from the squib 18 from passing outside of housing 1 rather than for any ambient sealing of compartment 4.

Operation of the device is accomplished by the passing of any appropriate electrical signal or current to squib 18 through conductor 18a, whereupon the high pressure gases formed causes piston 17 to travel in chamber 2 toward buffer 19. This passage of piston 17 causes coaction between the nose of 17 and surface 16 of lock member 10 to rotate lock member 10 in a counterclockwise direction, as indicated by arrow 23 in FIGURE 1, about the axis of pin 13. This rotation of lock member 10 causes pin 7 to move toward the intersection of the two branches of guide slot 15 whereupon as soon as it clears the restraint occasioned by surface 15c of slot 15 the compression spring 8 causes rod 6 to move in a direction to the left as seen in FIGURE 1 and indicated by arrow 24, and the mechanism connecting point 6a of rod 6 is likewise moved in the same direction and the release or actuation as desired is accomplished.

As has been noted, the centerline of branch 15a of slot 15 forms an acute angle with the centerline of rod 6 extending from the pin 7 to connecting point 6a. This provides a lock feature for the mechanism when cocked in that spring 8 must be additionally compressed beyond the cocked compression as pin 7 and rod 6 must move slightly to the right (or in a direction opposite of arrow 24) to enable the pin 7 to enter into branch 15b of slot 15. In the event of the spring 8 being in an atmosphere of adverse icing conditions this additional compression, which is powered by the explosive gas pressure of squib 18, tends to break away any ice formations prior to the movement of rod 6 by the spring 8. Additionally, this lock feature substantially decreases the possibility of inadvertent release due to shock loads as the embodiment depicted has withstood shock loads of more than 100 g's applied along its three primary axes without release.

As can be seen, this invention provides a relatively small, simple and rugged explosive powered release mechanism that is non-destructive and easily cocked into a releasable position.

While a particular embodiment of the invention has been illustrated and described, it will be obvious to those skilled in the art that various changes and modifications may be made without departing from the invention and it is intended to cover in the appended claims all such modifications and equivalents that fall within the true spirit and scope of this invention.

What is claimed is:

1. A release mechanism comprising: a housing having a cylinder and a compartment therein, a passage communicating said compartment with said cylinder, a piston in the cylinder, a rod means extending through said housing and compartment, means in the compartment coacting with said rod means for limiting the position of the rod means to a released position or a cocked position, means biasing the rod means towards the released position, said limiting means including lock means for retaining the rod means in the cocked position against said biasing means, a protuberance from the limiting means extending into the cylinder through said passage, and an explosive squib means for generating gases upon ignition for driving said piston through the cylinder, said piston travel tripping the lock means by the piston forcing said protuberance out of the cylinder toward the compartment.

2. A release mechanism comprising: a housing having a cylinder and a compartment therein, said cylinder and compartment in communication by a passage therebetween, a piston in the cylinder movable in one direction therethrough by pressurized gases, a rod means extending through said housing and compartment, a pin extending from said rod means within the housing, means normally biasing the rod means to a first position, a lock member movably mounted within the compartment with a projecting portion extending into the cylinder through said passage, lock means on said lock member cooperating with said pin for retaining said rod means in a second position against said biasing means, and stop means incorporated with said lock means to stop said rod movement caused by the biasing means at the first position when said lock means is tripped by the piston forcing said projecting portion out of the cylinder.

3. A non-destructive explosive powered release mechanism comprising: a housing having a compartment and a cylinder with a piston therein, a passage communicating said compartment with said cylinder, a cam slot member pivotally mounted in the compartment and having a projecting portion therefrom, said cam slot member having a first position wherein said projecting portion protrudes into the cylinder through said passage and a second position wherein the projecting portion is located completely outside the cylinder, a rod means extending through said housing and compartment, said rod means having a pin thereon riding within said member cam slot and movable from a first rod position wherein the pin is at one end of the cam slot as the cam slot member is in said first position to a second rod position wherein the pin is at the other end of the cam slot as the cam slot member is in said second position, spring means biasing the rod towards said second rod position, said cam slot member restraining movement of the rod when the cam slot member and rod are respectively in the first positions, and an explosive squib means for generating gases upon ignition for driving said piston through the cylinder, said piston travel moving the cam slot member toward the second position by the piston forcing the projecting portion protuberance out of the cylinder, said spring biasing means moving both the rod and cam slot member to their respective second positions.

4. A non-destructive explosive powered release mechanism comprising: a housing having a compartment and a cylinder with a piston therein, a passage communicating said compartment with said cylinder, a cam member pivotally mounted in the compartment and having an L-shaped cam slot therein, a portion projecting from the cam member, said cam member having a first position wherein said projecting portion protrudes into the cylinder through said passage and a second position wherein the projecting portion is located completely outside the cylinder, a rod means extending through said housing and compartment, said rod means having a pin thereon riding within said cam slot and movable from a first rod position where the pin is in one portion of the L-shaped cam slot as the cam member is in said first position to a second rod position wherein the pin is in the other portion of the L-shaped cam slot as the cam member is in said second position, spring means biasing the rod towards said second rod position, said cam slot member arranged in said cam to provide restraint of the rod against movement by the biasing means when the cam member and rod are respectively in the first positions, and an explosive squib means for generating gases upon ignition for driving said piston through the cylinder, said piston travel moving the cam member toward the second position by the piston forcing the projecting portion protuberance out of the cylinder, said spring biasing means moving both the rod and cam member to their respective second positions.

5. A non-destructive explosive powered release mechanism as claimed in claim 4 wherein said one portion of the cam slot containing the rod pin when the cam member is in the first position is arranged whereby pivotal movement of the cam member towards the second position causes a further compression of the bias spring by moving the rod pin away from the spring until the pin clears the one portion of the cam slot and reaches the other portion of the cam slot.

References Cited in the file of this patent

UNITED STATES PATENTS

| | | |
|---|---|---|
| 1,176,008 | Webster | Mar. 21, 1916 |
| 2,806,442 | Temple | Sept. 17, 1957 |
| 2,815,008 | Hirt | Dec. 3, 1957 |